(12) United States Patent
Bonny

(10) Patent No.: US 9,506,561 B1
(45) Date of Patent: Nov. 29, 2016

(54) FLOW DIVIDER ASSEMBLY

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 321 days.

(21) Appl. No.: 14/212,571

(22) Filed: Mar. 14, 2014

Related U.S. Application Data

(60) Provisional application No. 61/793,540, filed on Mar. 15, 2013.

(51) Int. Cl.
| | |
|---|---|
| *F15B 11/042* | (2006.01) |
| *F16H 61/444* | (2010.01) |
| *F15B 15/18* | (2006.01) |
| *F15B 11/22* | (2006.01) |
| *F15B 13/02* | (2006.01) |
| *F03C 1/06* | (2006.01) |

(52) U.S. Cl.
CPC .......... *F16H 61/444* (2013.01); *F15B 11/042* (2013.01); *F15B 11/22* (2013.01); *F15B 13/022* (2013.01); *F15B 15/18* (2013.01); *F03C 1/0642* (2013.01); *F03C 1/0663* (2013.01); *F03C 1/0668* (2013.01); *F15B 2211/4053* (2013.01); *F15B 2211/40523* (2013.01); *F15B 2211/40538* (2013.01); *F15B 2211/782* (2013.01)

(58) Field of Classification Search
CPC .... F16H 61/444; F15B 15/18; F15B 11/042; F15B 11/22; F15B 13/022; F15B 2211/40523; F15B 2211/4053; F15B 2211/40538; F15B 2211/782; F15B 2215/30; F03C 1/0639; F03C 1/0642; F03C 1/0663; F03C 1/0668
USPC .............................. 60/483, 484; 91/171, 515
See application file for complete search history.

(56) References Cited

U.S. PATENT DOCUMENTS

| | | | |
|---|---|---|---|
| 2,353,802 A | 7/1944 | Zimmermann | |
| 2,862,449 A | 12/1958 | Wyland | |
| 4,041,843 A * | 8/1977 | Mischenko | B30B 15/24 60/484 |
| 4,102,425 A | 7/1978 | Marsden et al. | |
| 4,201,272 A | 5/1980 | Midolo | |
| 4,639,203 A | 1/1987 | Zumbusch | |
| 5,511,368 A * | 4/1996 | Kocher | A01D 34/866 56/15.2 |
| 6,922,992 B1 * | 8/2005 | Morgan | F15B 11/22 60/484 |
| 6,973,783 B1 * | 12/2005 | Hauser | F04B 1/324 60/484 |
| 7,000,386 B1 | 2/2006 | Morgan | |
| 7,526,994 B2 | 5/2009 | Hu | |
| 7,988,428 B1 | 8/2011 | MacHarg | |
| 2010/0050627 A1 | 3/2010 | Nelson et al. | |

FOREIGN PATENT DOCUMENTS

DE        2857567 A1 *  8/1980  ............ F03C 1/0639

* cited by examiner

*Primary Examiner* — Logan Kraft
(74) *Attorney, Agent, or Firm* — Neal, Gerber & Eisenberg LLP

(57) ABSTRACT

A flow divider assembly for use with a hydraulic pump provides flow to separate drive motors for use in a vehicle or other application. A pair of flow divider motors may be mounted on a block and have a common axis of rotation. The ratio between the two may be controlled by adjustment of the angles of the respective thrust bearings of the flow divider motors. A valve may connect the outlet of one of the flow divider motors or the outlet of the other flow divider motor. passage to the second outlet passage. Additional bypass valves may be provided to permit direct connection between the hydraulic pump and the separate drive motors.

20 Claims, 13 Drawing Sheets

FLOW DIVIDER ASSEMBLY

CROSS-REFERENCE TO RELATED APPLICATION

This application claims priority to U.S. Provisional Patent Application No. 61/793,540, filed on Mar. 15, 2013, the contents of which are fully incorporated herein by reference.

BACKGROUND OF THE INVENTION

This invention relates generally to flow control mechanisms for use with a hydraulic apparatus.

SUMMARY OF THE INVENTION

The inventions herein disclose flow controls for use in connection with, e.g., vehicle implements and other applications where the flow of a variable displacement, single direction pump needs to be divided to different flow paths. In certain embodiments a constant proportion flow divider may be used, while other embodiments depict the use of different valves to permit further control.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
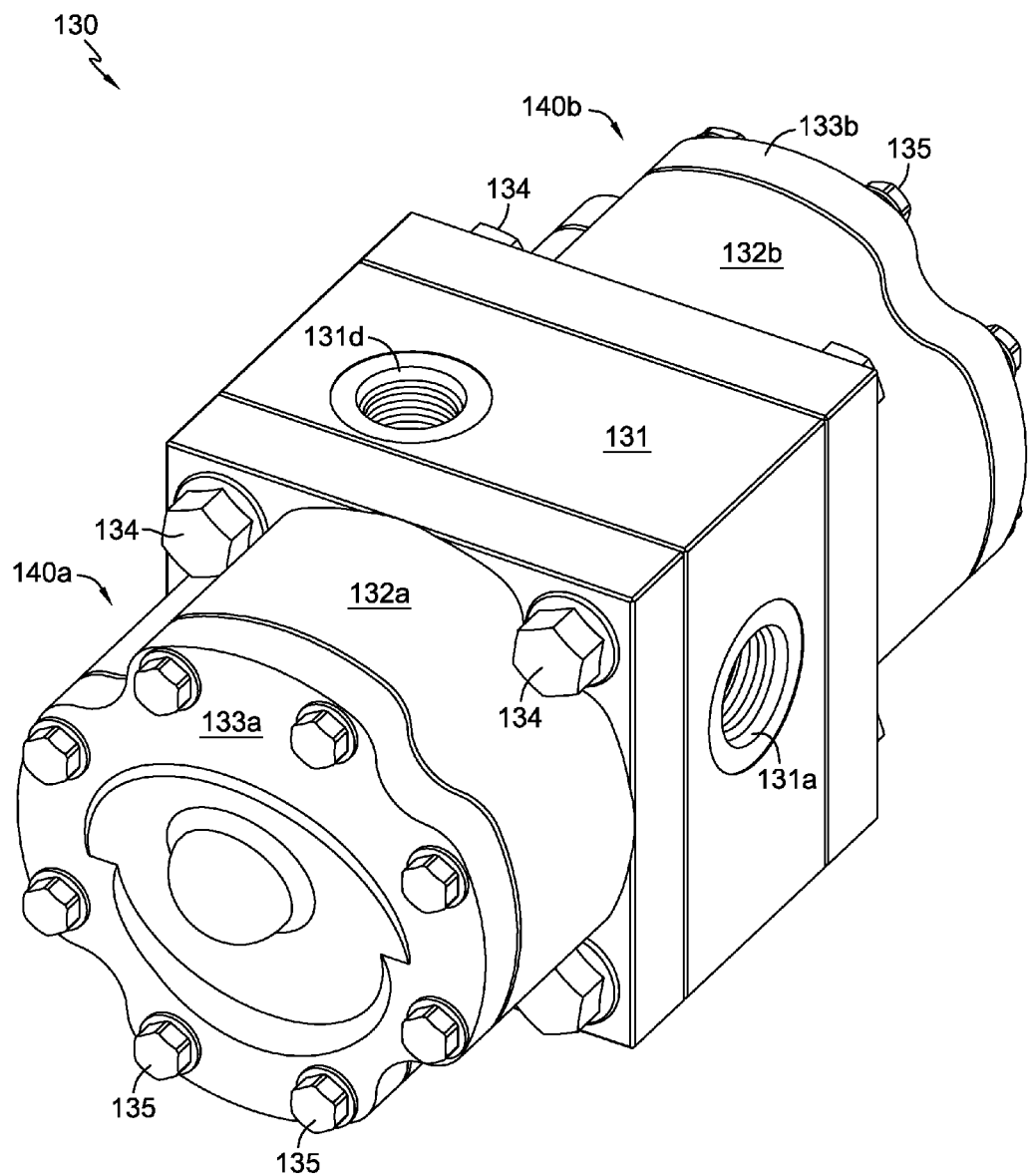
FIG. 1 is a perspective view of a dual motor flow divider assembly in accordance with a first embodiment of the invention.
Figure 2:
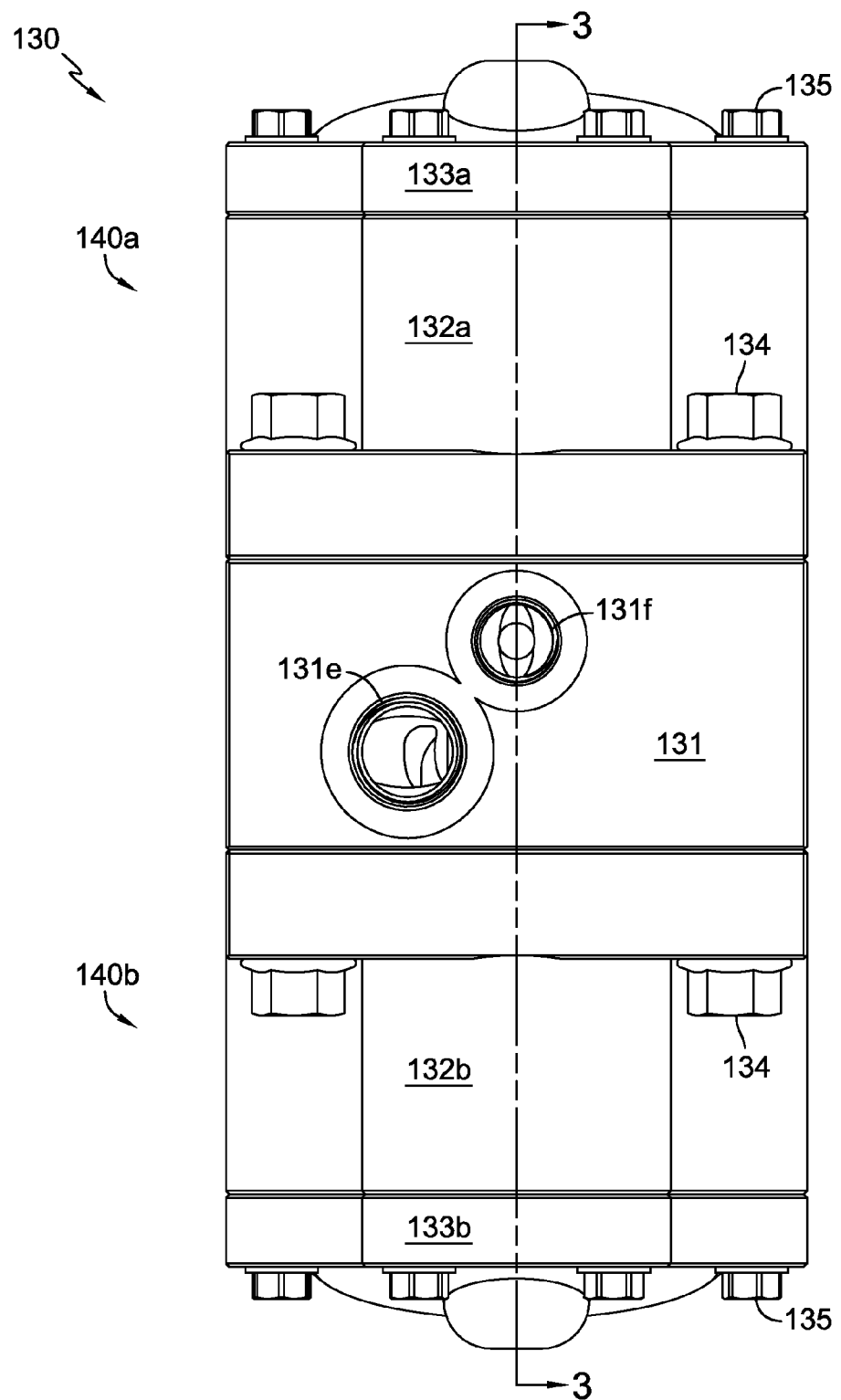
FIG. 2 is a side elevational view of the flow divider assembly of FIG. 1.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. To the extent elements are given numerals that differ in the prefix to those of elements previously described and are not described in detail, it will be understood that such elements can be essentially or substantively identical to the previously described feature. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 6:
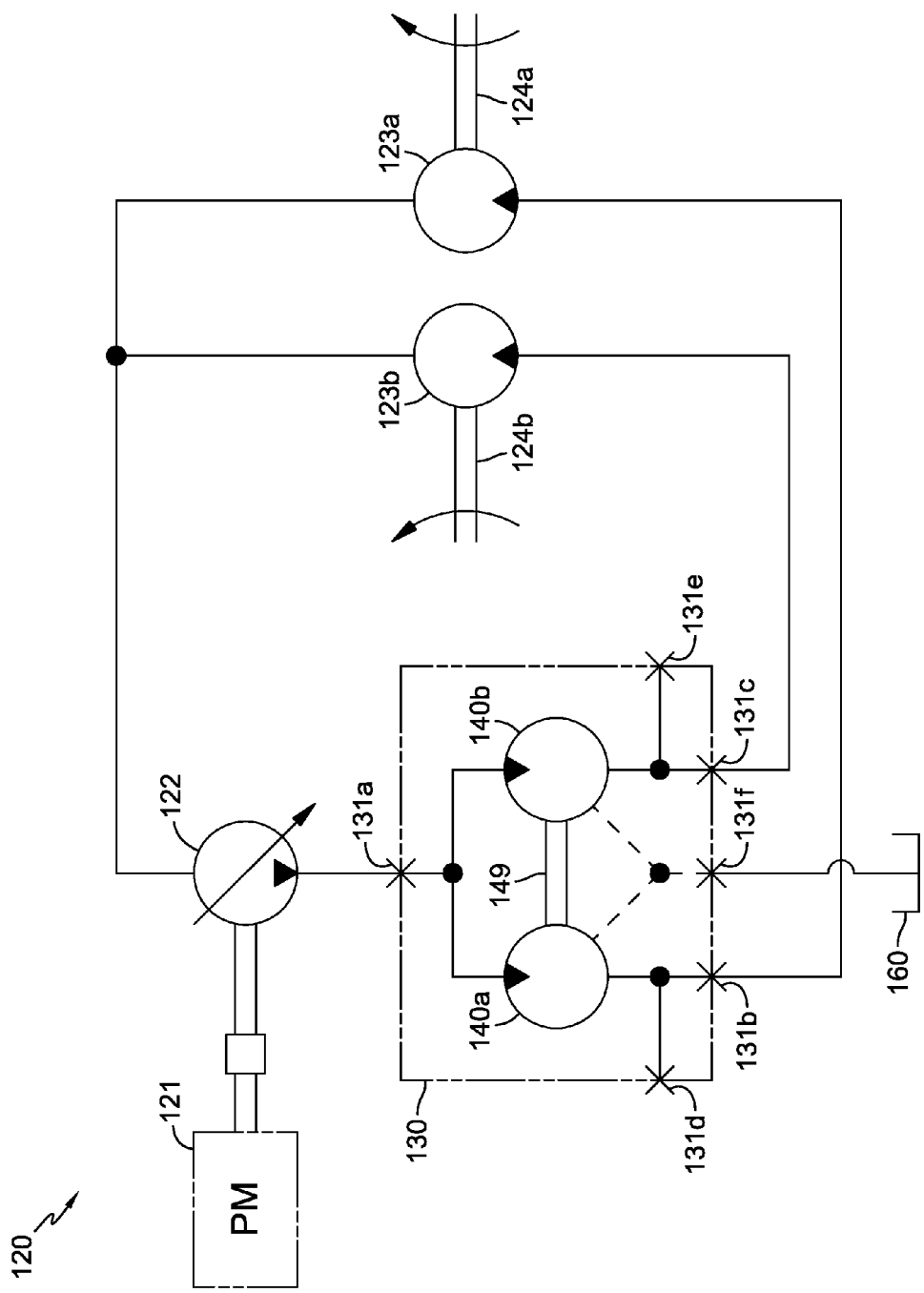
FIG. 6 is a schematic showing an exemplary drive system incorporating the flow divider assembly of FIG. 1.
Figure 7:
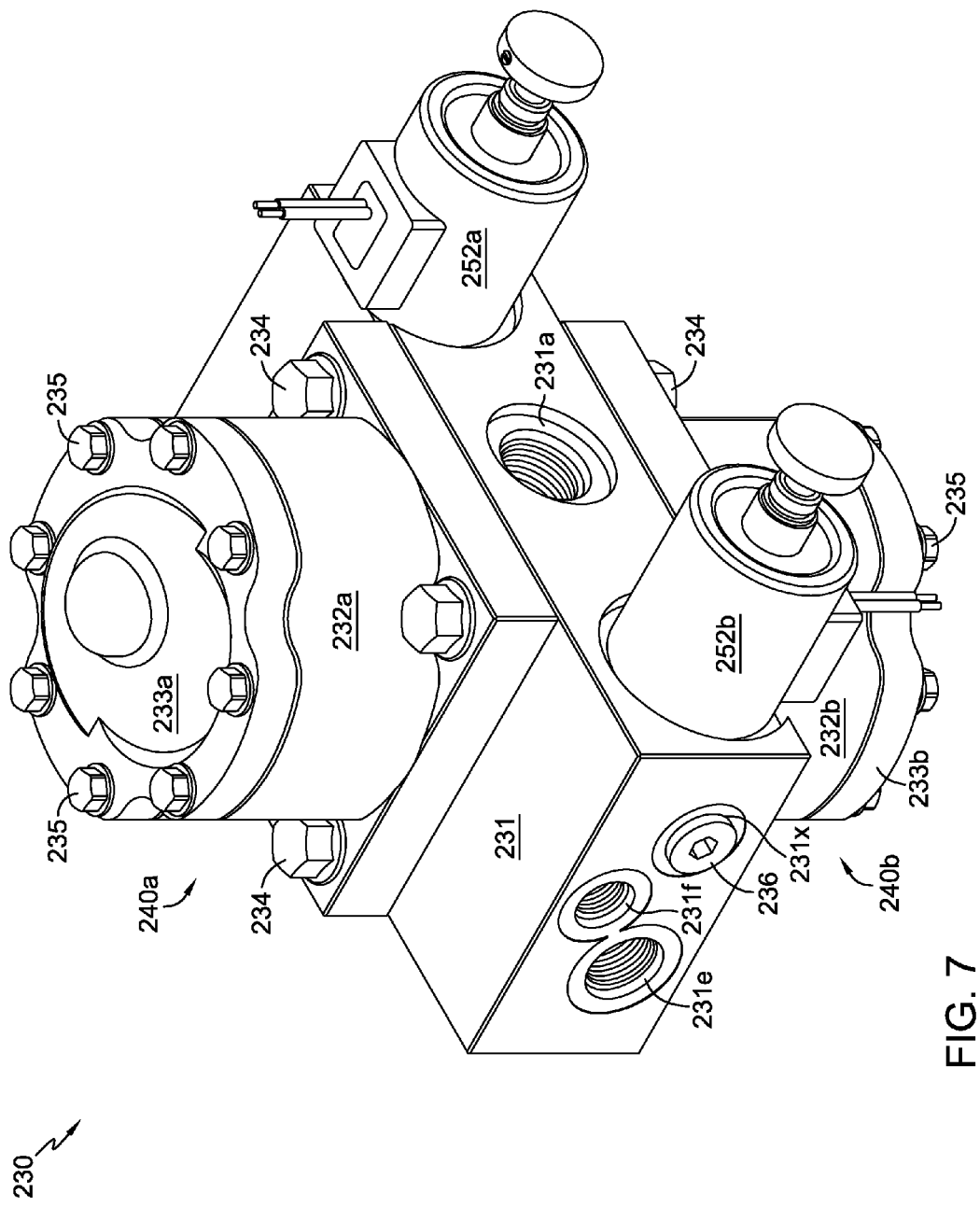
FIG. 7 is a perspective view of a dual motor flow divider assembly in accordance with a second embodiment of the invention.
Figure 8:
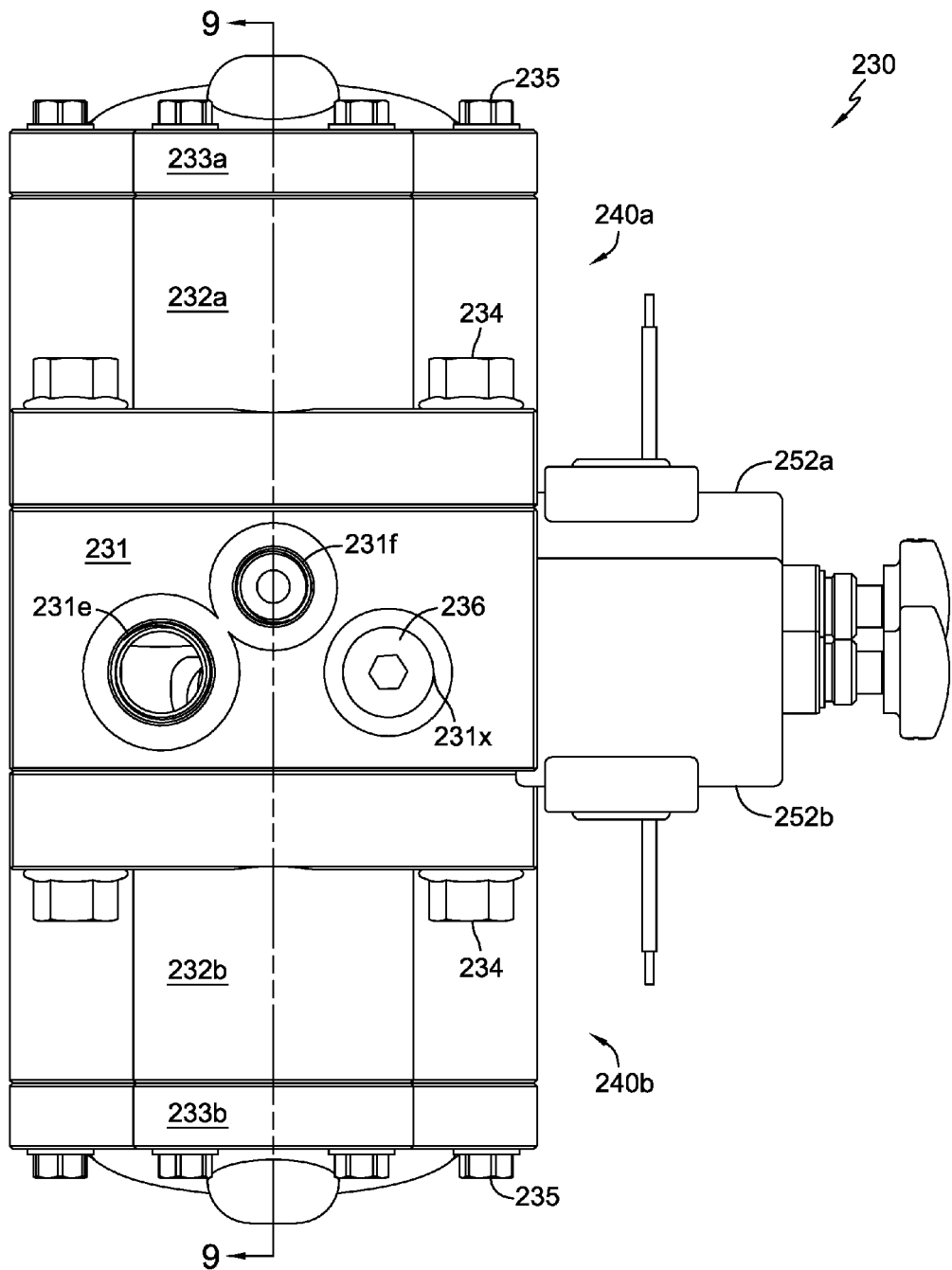
FIG. 8 is a side elevational view of the flow divider assembly of FIG. 7.
Figure 9:
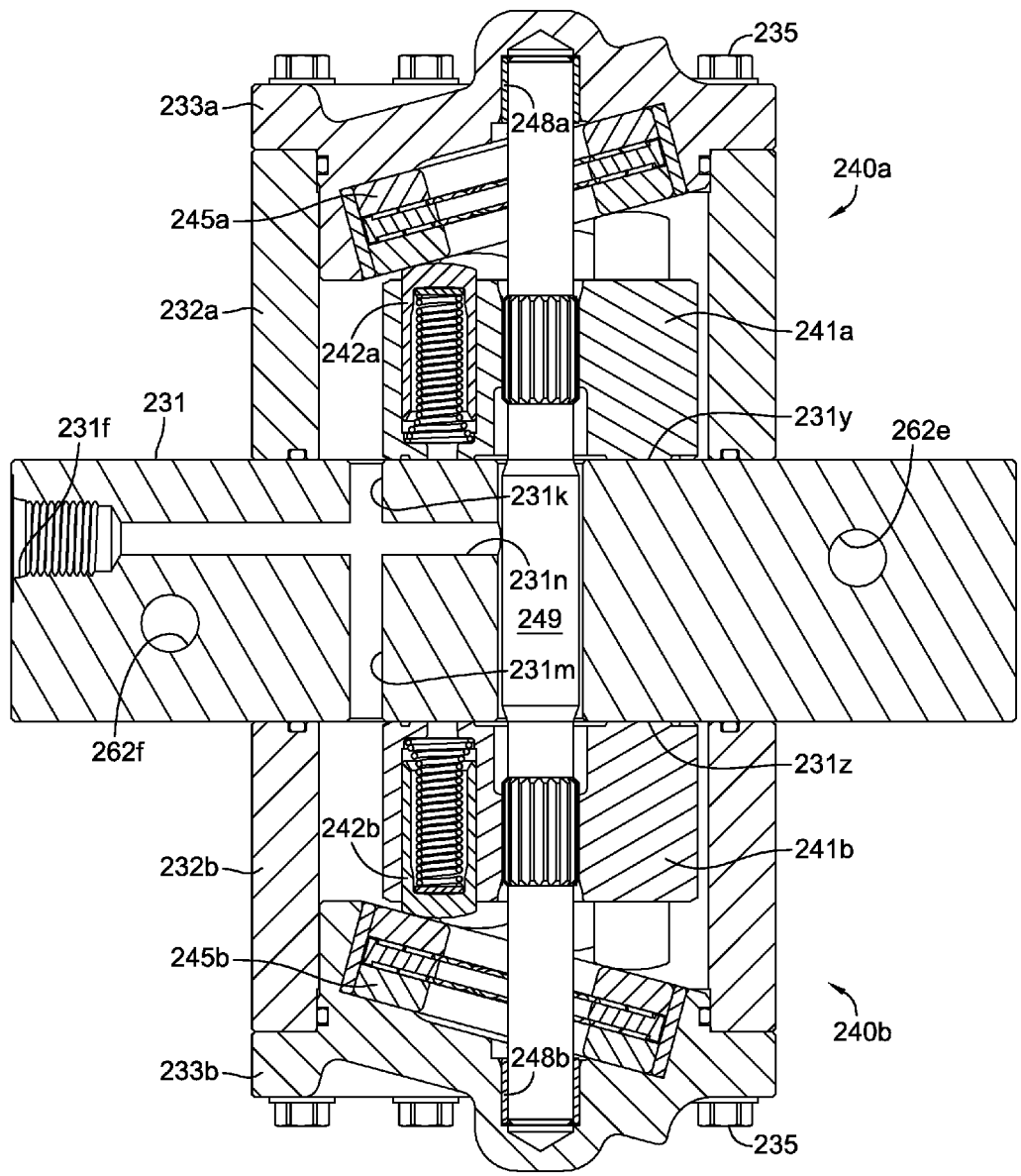
FIG. 9 is a cross-sectional view along the lines 9-9 of FIG. 7.
Figure 10:
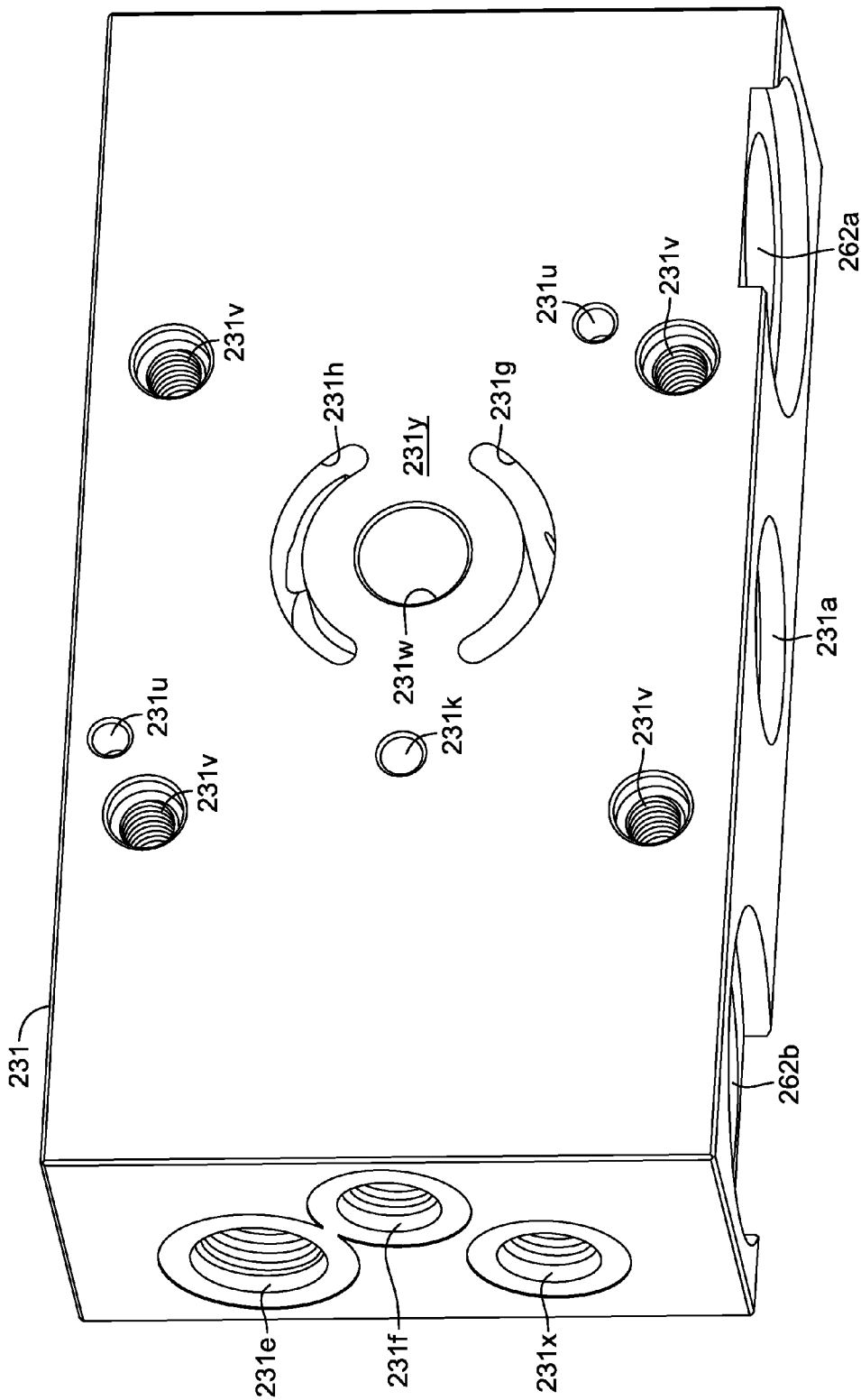
FIG. 10 is a perspective view of a port block as may be used in the flow divider assembly of FIG. 7.
Figure 11:
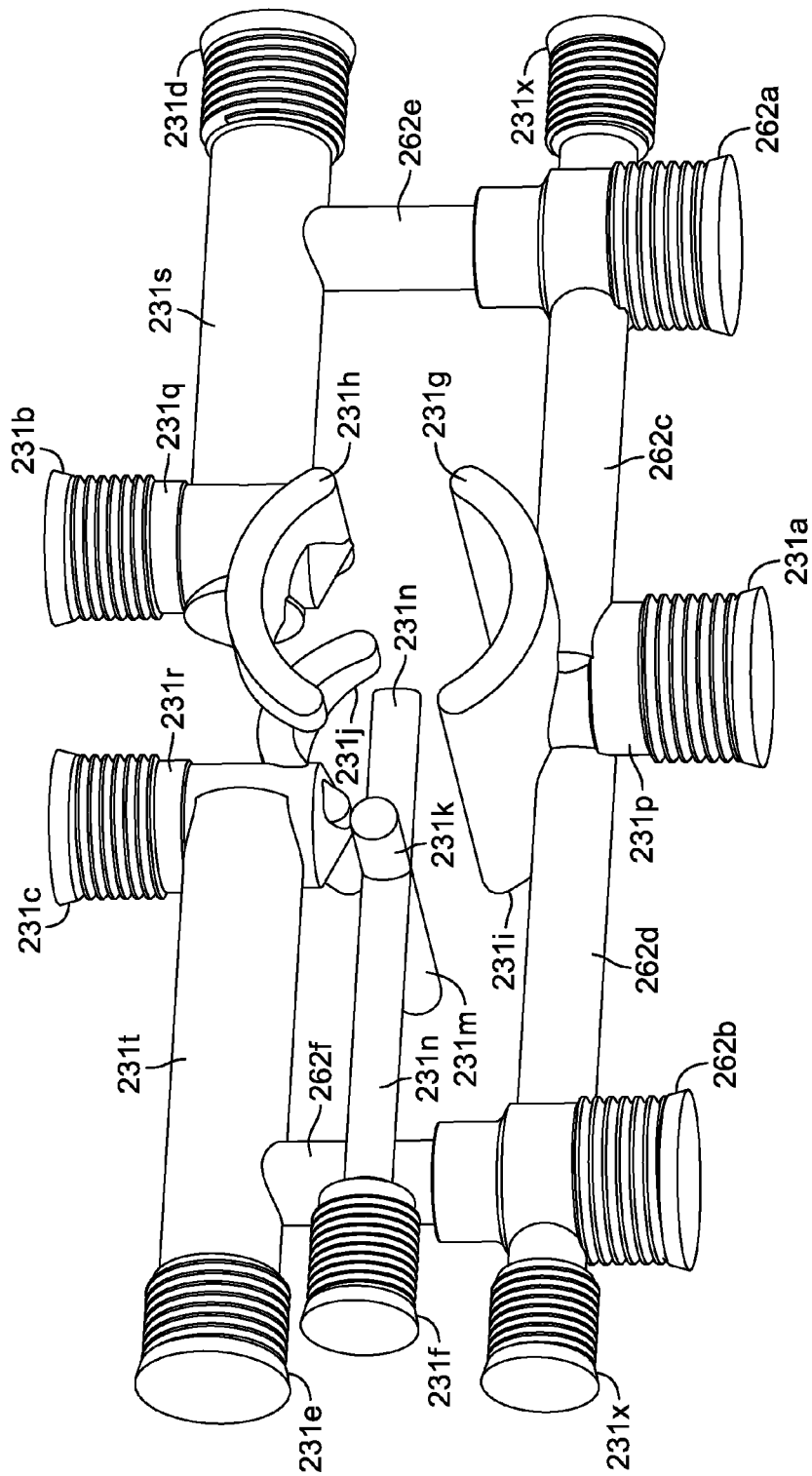
FIG. 11 is a representational, perspective view of the hydraulic porting inside the port block of the flow divider assembly of FIG. 7.
Figure 12:
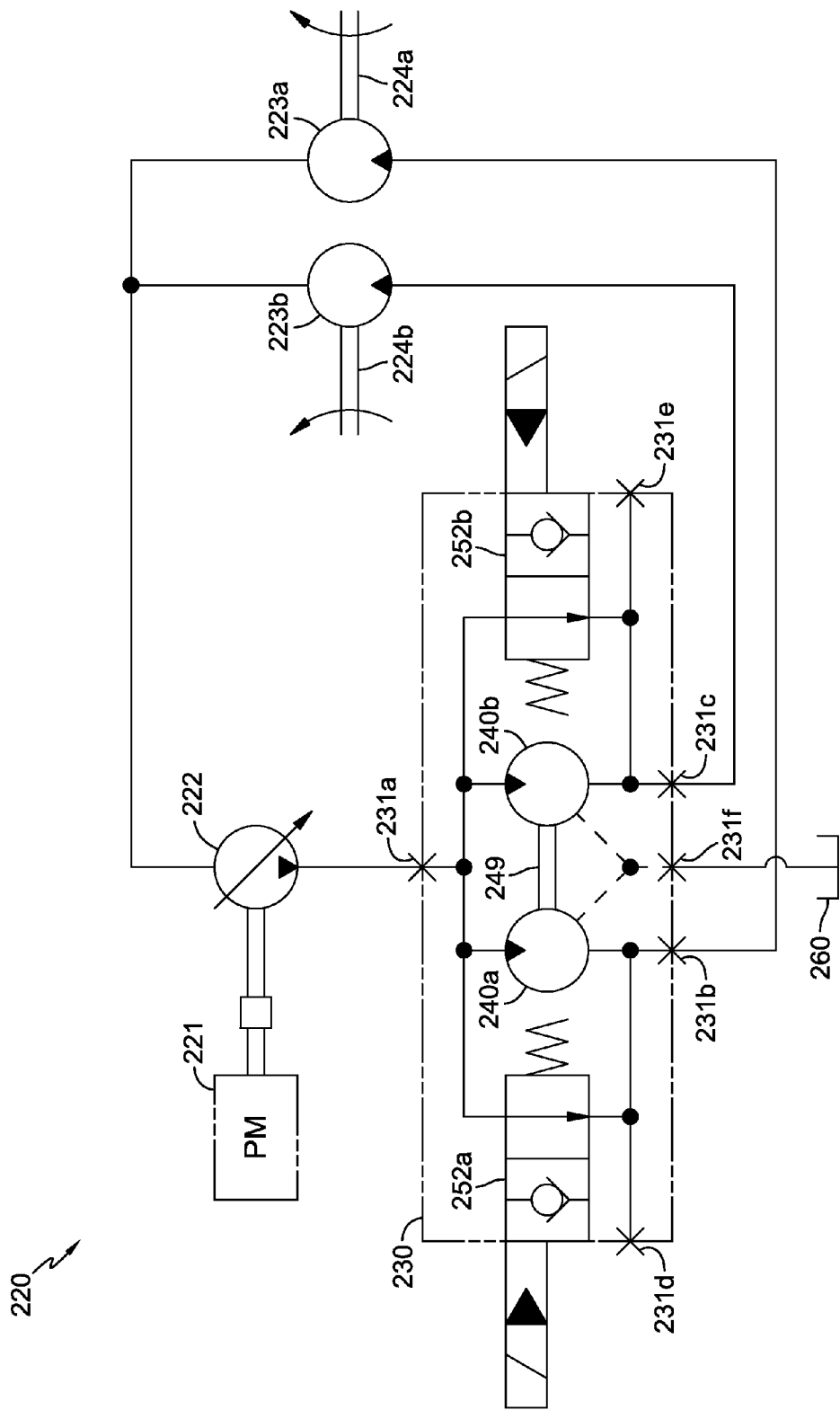
FIG. 12 is a schematic showing an exemplary drive system incorporating the flow divider assembly of FIG. 7.

FIG. 1 depicts a flow divider assembly 130 incorporating a pair of motor assemblies 140a and 140b, which may be referred to as flow divider motors, disposed on a port block 131. The schematic in FIG. 6 shows drive system 120 having flow divider assembly 130 as well as prime mover 121 driving a variable displacement pump 122. The output of flow divider assembly 130 drives a pair of motors 123a, 123b and their respective drive shafts or axles 124a, 124b for a vehicle or other application.

Each motor assembly 140a, 140b comprises a motor housing 132a, 132b having a proximal end secured to the respective opposing faces of port block 131 by means of fasteners 134. Each housing also includes a cap 133a, 133b secured to the distal end of the respective motor housing 132a, 132b by means of fasteners 135. The two motor cylinder blocks 141a and 141b disposed with the respective motor housings 132a, 132b, on a pair of running surfaces 131y (running surface A) and 131z (running surface B) formed on opposing faces of port block 131.

Figure 3:
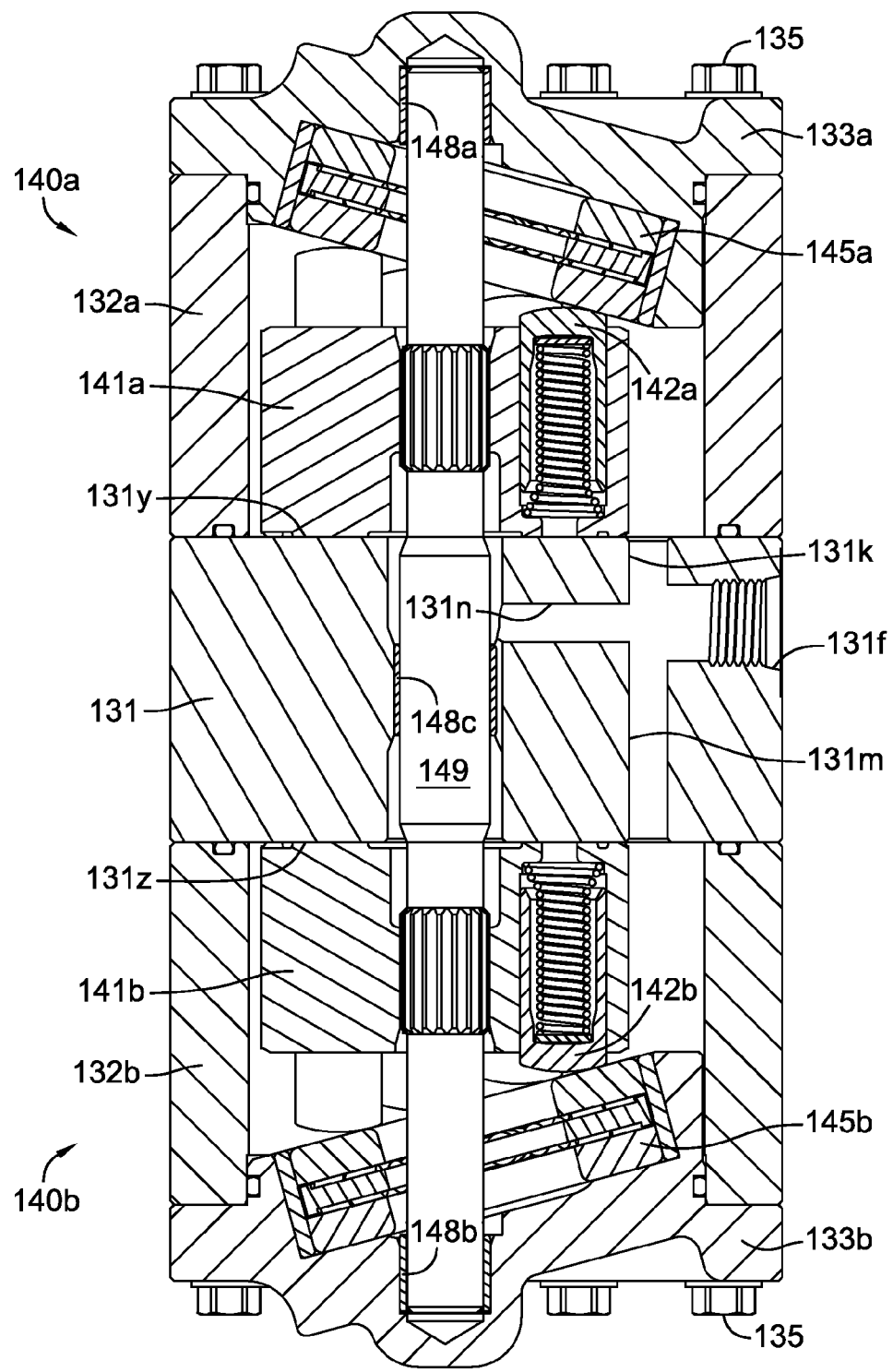
FIG. 3 is a cross-sectional view along the lines 3-3 of FIG. 2.
Figure 4:
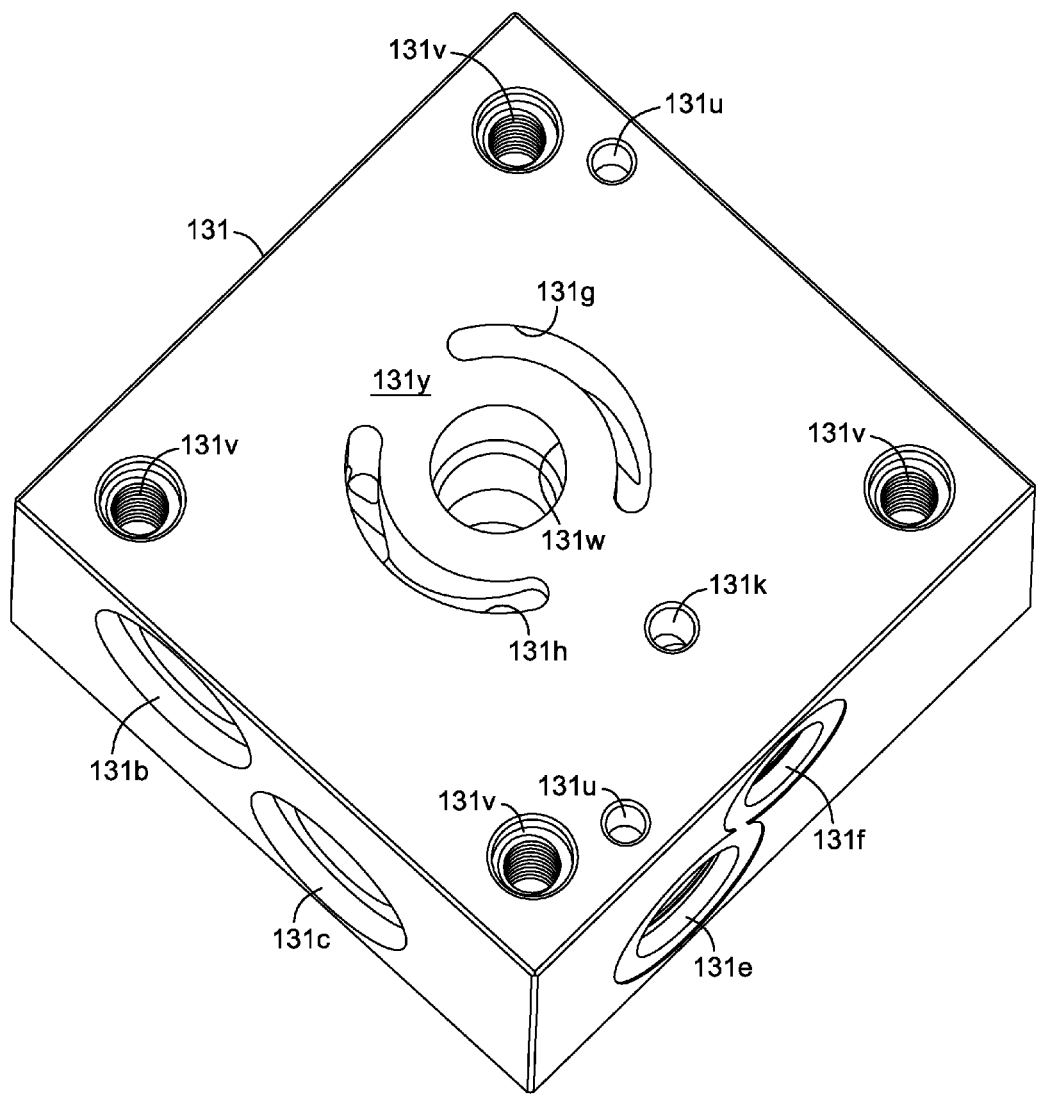
FIG. 4 is a perspective view of a port block as may be used in the flow divider assembly of FIG. 1.
Figure 5:
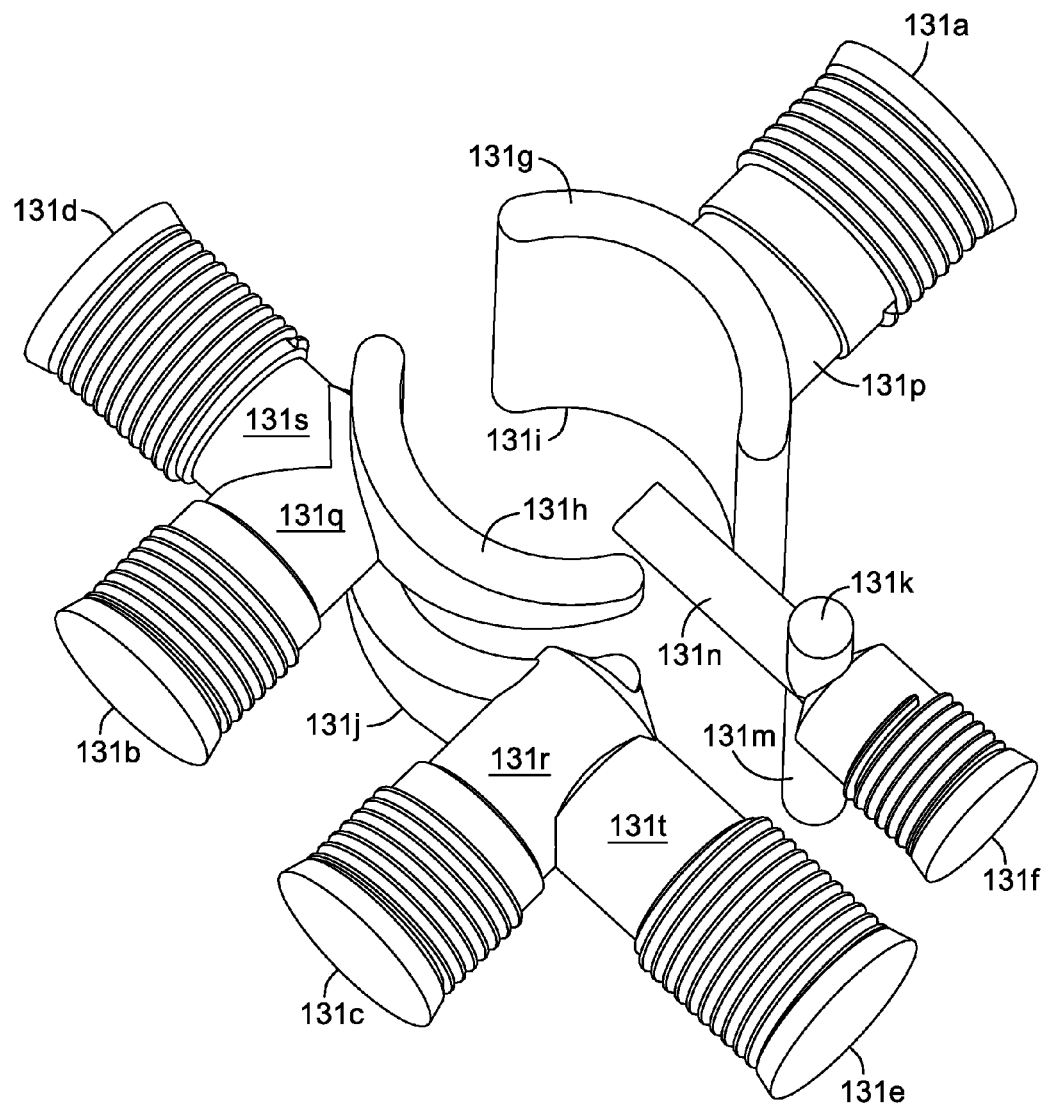
FIG. 5 is a representational, perspective view of the hydraulic porting inside the port block of the flow divider assembly of FIG. 1.

Mounted within each cap 133a, 133b is a thrust bearing 145a, 145b. As shown most clearly in FIG. 3, the two cylinder blocks 141a, 141b include a respective set of motor pistons 142a, 142b engaged to thrust bearings 145a, 145b. Motor shaft 149 extends through port block 131 and engages first motor cylinder block 141a at a first portion of motor shaft 149 and engages second motor cylinder block 141b at a second portion of motor shaft 149. These engagements are depicted herein as splines. As shown in FIG. 3, motor shaft 149 is supported by bearing 148a in cap 133a, bearing 148b in cap 133b, and bearing 148c in port block 131.

Port block 131 comprises inlet port 131a, outlet port A 131b, outlet port B 131c, kidney inlet port A 131g, kidney outlet port A 131h, kidney inlet port B 131i, kidney outlet port B 131j, inlet passage 131p, outlet passage A 131q; outlet passage B 131r; alignment pin holes 131u; threaded openings 131v and shaft opening 131w. Drain port 131f is connected to drain passage A 131k, drain passage B 131m and central drain passage 131n and exhausts to an external reservoir 160. Two optional outlet ports, namely optional outlet port A 131*d* and optional outlet port B 131*e*, are connected to optional outlet passage A 131*s* and optional outlet passage B 131*t*, respectively, to provide flexibility in terms of mounting or installation of the unit.

This embodiment is a constant split flow design, with possible variance being introduced by means of changing the ratio of motors 140*a* and 140*b*, i.e., by changing the angle of thrust bearing 145*a* from the axis of rotation of motor shaft 149 with respect to the angle of thrust bearing 145*b* to that axis, in order to provide different output to drive motors 123*a*, 123*b*, or by using motors having different displacements. The user can set the angles of thrust bearings 145*a*, 145*b*, depending on the desired output of the respective motors 140*a* and 140*b*. The mounting of the thrust bearings in the caps 133*a* and 133*b* simplifies such modifications.

The second embodiment of FIGS. 7-12 is similar in many respects to the first embodiment, and as noted above, those elements that may be structurally or operationally identical to those previously described will not be described in detail as such a description is not critical to an understanding of the invention. Flow divider assembly 230 incorporates port block 231, which may be somewhat larger in size than port block 131 to incorporate a pair of valves, and specifically as shown herein electronically actuated solenoid valves 252*a* and 252*b*. As shown most clearly in the schematic of FIG. 12, valves 252*a* and 252*b*, which may be of a standard design, permit the user to bypass the motors 240*a*, 240*b* in the event the user wishes to prevent flow to one of the motors 223*a*, 223*b*.

As in the prior embodiment, the output of flow divider assembly 230 drives a pair of motors 223*a*, 223*b* and their respective drive shafts or axles 224*a*, 224*b* for a vehicle or other application. Each motor assembly 240*a*, 240*b* comprises a motor housing 232*a*, 232*b* having a cap 233*a*, 233*b* secured thereto by means of fasteners 235, and a motor cylinder block 241*a*, 241*b* disposed therein and including motor pistons 242*a*, 242*b* engaged to thrust bearings 245*a*, 245*b*. Motor housings 232*a*, 232*b* are fastened to port block 231 by means of fasteners 234. Motor shaft 249 extends through port block 231.

Port block 231 comprises inlet port 231*a*, outlet port A 231*b*, outlet port B 231*c*, kidney inlet port A 231*g*, kidney outlet port A 231*h*, kidney inlet port B 231*i*, kidney outlet port B 231*j*, inlet passage 231*p*, outlet passage A 231*q*; outlet passage B 231*r*; alignment pin holes 231*u*; threaded openings 231*v*, shaft opening 231*w*, and a pair of running surfaces 231*y* (running surface A) and 231*z* (running surface B). Drain port 231*f* is connected to drain passage A 231*k*, drain passage B 231*m* and central drain passage 231*n* and exhausts to an external reservoir 260. Two optional outlet ports, namely optional outlet port A 231*d* and optional outlet port B 231*e*, are connected to optional outlet passage A 231*s* and optional outlet passage B 231*t*, respectively, to provide flexibility in terms of mounting or installation of the unit. Machining ports 231*x* closed by plugs 236 may also be used in assembly.

Figure 13:
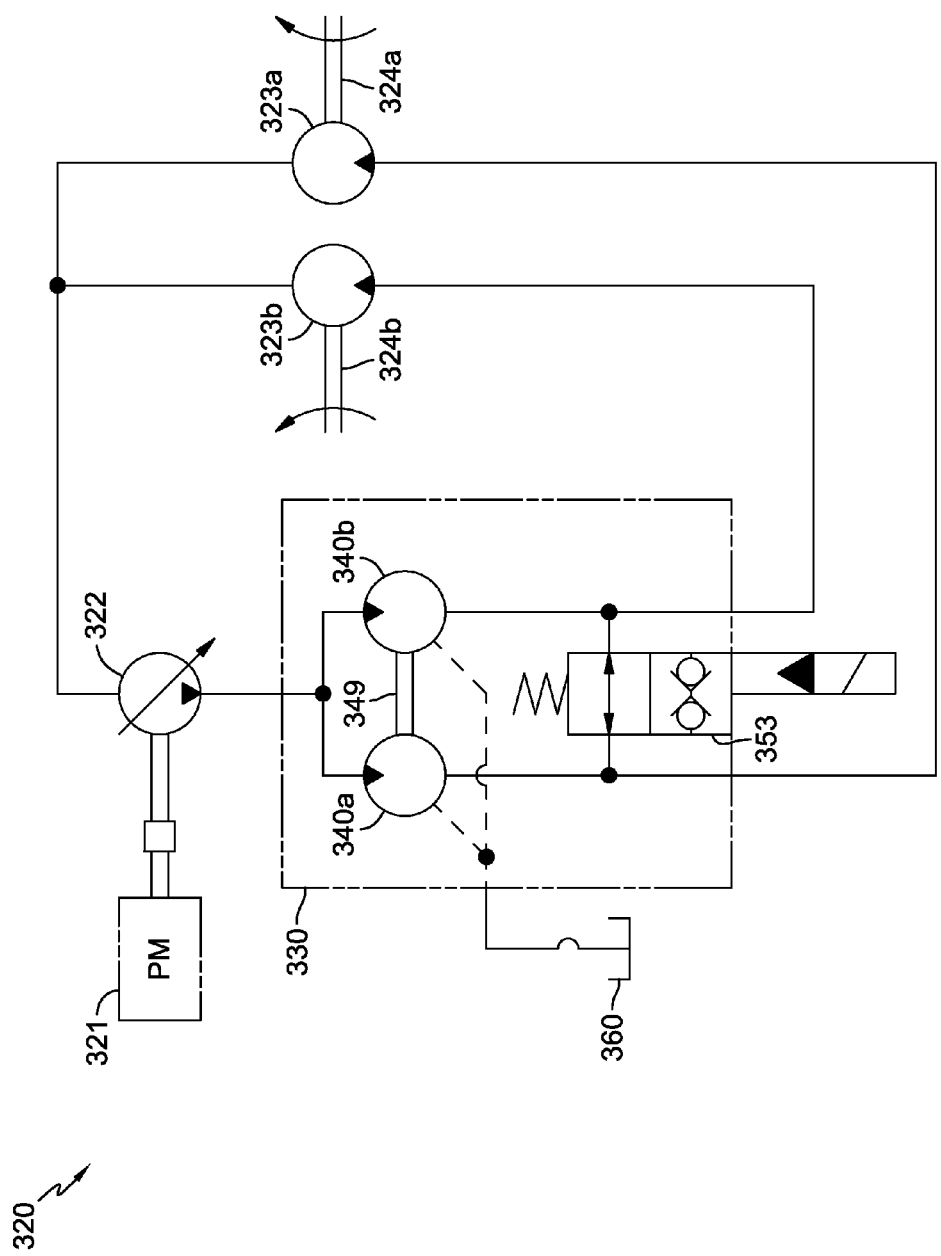
FIG. 13 is a schematic showing an exemplary drive system incorporating a third embodiment incorporating a flow divider in accordance with the principles of the present invention.

A third embodiment is shown schematically in FIG. 13. This embodiment is similar in many respects to the embodiment shown in FIG. 12 but uses a single, bi-directional valve 353 in place of the two valves of the prior embodiment. Valve 353 is preferably a solenoid operated valve and when valve 353 is in the closed position, flow divider assembly 330 will operate substantially the same as flow divider assembly 130 in the first embodiment. When valve 353 is opened, the flow from motors 340*a*, 340*b* will take the path of least resistance, in the event that the output of one of the motors 323*a*, 323*b* is blocked, for example. As shown, motors 323*a*, 323*b* drive respective drive shafts or axles 324*a*, 324*b*. Flow divider assembly is also connected to a sump 360, in a manner as set forth previously.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof. For example, while certain embodiments are shown schematically, it will be understood that the basic structural elements can be similar in many respects to those of the earlier embodiments.

What is claimed is:

1. A hydraulic drive assembly, comprising:
   a hydraulic pump;
   a flow divider assembly hydraulically connected to the hydraulic pump, the flow divider assembly comprising:
      a port block having a first face and a second face, opposite to the first face, with a first running surface formed on the first face and a second running surface formed on the second face;
      a first motor housing engaged to the first face and a second motor housing engaged to the second face;
      a single motor shaft having an axis of rotation and extending through the port block and having a first end extending into the first motor housing and a second end extending into the second motor housing;
      a first motor cylinder block rotatably disposed on the first running surface and engaged to the motor shaft, the first motor cylinder block having a first plurality of pistons disposed therein;
      a first fixed swash plate disposed in the first motor housing and mounted at a first angle with respect to the axis of rotation;
      a second motor cylinder block rotatably disposed on the second running surface and engaged to the motor shaft, the second motor cylinder block having a second plurality of pistons disposed therein;
      a second fixed swash plate disposed in the second motor housing and mounted at a second angle with respect to the axis of rotation;
      a single inlet port connected to the hydraulic pump to provide fluid from the hydraulic pump to both the first motor cylinder block and the second motor cylinder block;
      a first outlet port connected to the first motor cylinder block and a second outlet port connected to the second motor cylinder block, wherein the first motor cylinder block provides a first level of hydraulic output and the second motor cylinder block provides a second level of hydraulic output;
   a first drive motor hydraulically connected to the first outlet port and a second drive motor hydraulically connected to the second outlet port, whereby the first drive motor is hydraulically powered by the first level of hydraulic output and the second drive motor is hydraulically powered by the second level of hydraulic output; and
   a first valve disposed in the port block and connecting the single inlet port with the first outlet port, whereby a user may bypass the first motor cylinder block.

2. The hydraulic drive assembly of claim 1, further comprising a drain port formed in the port block and connected to the first motor cylinder block and the second motor cylinder block.

3. The hydraulic drive assembly of claim 2, further comprising a separate reservoir connected to the drain port.

4. The hydraulic drive assembly of claim 1, wherein the first motor housing comprises a first cap and the second motor housing comprises a second cap, and the first fixed swash plate is mounted in the first cap and the second fixed swash plate is mounted in the second cap.

5. The hydraulic drive assembly of claim 1, further comprising a third outlet port formed in the port block and connected to the first motor cylinder block and a fourth outlet port formed in the port block and connected to the second motor cylinder block.

6. The hydraulic drive assembly of claim 1, further comprising a second valve disposed in the port block and connecting the single inlet port with the second outlet port, whereby the user may bypass the second motor cylinder block.

7. The hydraulic drive assembly of claim 6, wherein the first valve and the second valve each consist of electronically actuated solenoid valves.

8. A hydraulic drive assembly, comprising:
a hydraulic pump;
a flow divider assembly hydraulically connected to the hydraulic pump, the flow divider assembly comprising:
a port block having a first face and a second face, opposite to the first face, with a first running surface formed on the first face and a second running surface formed on the second face;
a first motor housing engaged to the first face and a second motor housing engaged to the second face;
a single motor shaft having an axis of rotation and extending through the port block and having a first end extending into the first motor housing and a second end extending into the second motor housing;
a first motor cylinder block rotatably disposed on the first running surface and engaged to the motor shaft, the first motor cylinder block having a first plurality of pistons disposed therein;
a first fixed swash plate disposed in the first motor housing and mounted at a first angle with respect to the axis of rotation;
a second motor cylinder block rotatably disposed on the second running surface and engaged to the motor shaft, the second motor cylinder block having a second plurality of pistons disposed therein;
a second fixed swash plate disposed in the second motor housing and mounted at a second angle with respect to the axis of rotation;
a single inlet port connected to the hydraulic pump to provide fluid from the hydraulic pump to both the first motor cylinder block and the second motor cylinder block;
a first outlet port connected to the first motor cylinder block and a second outlet port connected to the second motor cylinder block, wherein the first motor cylinder block provides a first level of hydraulic output and the second motor cylinder block provides a second level of hydraulic output;
a first drive motor hydraulically connected to the first outlet port and a second drive motor hydraulically connected to the second outlet port, whereby the first drive motor is hydraulically powered by the first level of hydraulic output and the second drive motor is hydraulically powered by the second level of hydraulic output; and
a single bi-directional valve disposed in the port block and connecting the output of the first motor cylinder block with the output of the second motor cylinder block when the single bi-directional valve is opened.

9. The hydraulic drive assembly of claim 8, wherein the single bi-directional valve is a solenoid operated valve.

10. A hydraulic drive assembly for use in conjunction with a prime mover driving a hydraulic pump, the hydraulic drive assembly comprising:
a flow divider assembly comprising an inlet connected to the hydraulic pump, a first flow divider motor connected to the inlet and providing hydraulic flow to a first outlet port through a first outlet passage, and a second flow divider motor connected to the inlet and providing hydraulic flow to a second outlet port through a second outlet passage, and a single valve connecting the first outlet passage to the second outlet passage;
a first drive motor connected to the first outlet port and a second drive motor connected to the second outlet port.

11. The hydraulic drive assembly of claim 10, further comprising a single motor shaft engaged to both the first flow divider motor and the second flow divider motor, whereby the first flow divider motor and the second flow divider motor have a common axis of rotation.

12. A flow divider assembly for use with a hydraulic system including a hydraulic pump, the flow divider assembly comprising:
a port block having a first face and a second face, opposite to the first face, with a first running surface formed on the first face and a second running surface formed on the second face;
a first motor housing engaged to the first face and a second motor housing engaged to the second face;
a motor shaft having an axis of rotation and extending through the port block and having a first end extending into the first motor housing and a second end extending into the second motor housing;
a first motor cylinder block rotatably disposed on the first running surface and engaged to the motor shaft, the first motor cylinder block having a first plurality of pistons disposed therein;
a first fixed swash plate disposed in the first motor housing and mounted at a first angle with respect to the axis of rotation;
a second motor cylinder block rotatably disposed on the second running surface and engaged to the motor shaft, the second motor cylinder block having a second plurality of pistons disposed therein;
a second fixed swash plate disposed in the second motor housing and mounted at a second angle with respect to the axis of rotation;
a single inlet port connected to the hydraulic pump to provide fluid from the hydraulic pump to both the first motor cylinder block and the second motor cylinder block;
a first outlet port connected to the first motor cylinder block and a second outlet port connected to the second motor cylinder block, wherein the first motor cylinder block provides a first level of hydraulic output and the second motor cylinder block provides a second level of hydraulic output; and
a first valve disposed in the port block and connecting the single inlet port with the first outlet port, whereby a user may bypass the first motor cylinder block, and a second valve disposed in the port block and connecting the single inlet port with the second outlet port, whereby the user may bypass the second motor cylinder block.

13. The flow divider assembly of claim 12, further comprising a drain port formed in the port block and connected to the first motor cylinder block and the second motor cylinder block, and a separate reservoir connected to the drain port.

14. The flow divider assembly of claim 12, wherein the first motor housing comprises a first cap and the second motor housing comprises a second cap, and the first fixed swash plate is mounted in the first cap and the second fixed swash plate is mounted in the second cap.

15. The flow divider assembly of claim 12, further comprising a third outlet port formed in the port block and connected to the first motor cylinder block and a fourth outlet port formed in the port block and connected to the second motor cylinder block.

16. The flow divider assembly of claim 12, wherein the first valve and the second valve each consist of electronically actuated solenoid valves.

17. A flow divider assembly for use with a hydraulic system including a hydraulic pump, the flow divider assembly comprising:
- a port block having a first face and a second face, opposite to the first face, with a first running surface formed on the first face and a second running surface formed on the second face;
- a first motor housing engaged to the first face and a second motor housing engaged to the second face;
- a motor shaft having an axis of rotation and extending through the port block and having a first end extending into the first motor housing and a second end extending into the second motor housing;
- a first motor cylinder block rotatably disposed on the first running surface and engaged to the motor shaft, the first motor cylinder block having a first plurality of pistons disposed therein;
- a first fixed swash plate disposed in the first motor housing and mounted at a first angle with respect to the axis of rotation;
- a second motor cylinder block rotatably disposed on the second running surface and engaged to the motor shaft, the second motor cylinder block having a second plurality of pistons disposed therein;
- a second fixed swash plate disposed in the second motor housing and mounted at a second angle with respect to the axis of rotation;
- a single inlet port connected to the hydraulic pump to provide fluid from the hydraulic pump to both the first motor cylinder block and the second motor cylinder block;
- a first outlet port connected to the first motor cylinder block and a second outlet port connected to the second motor cylinder block, wherein the first motor cylinder block provides a first level of hydraulic output and the second motor cylinder block provides a second level of hydraulic output; and
- a single bi-directional valve disposed in the port block and connecting the output of the first motor cylinder block with the output of the second motor cylinder block when the single bi-directional valve is opened.

18. The flow divider assembly of claim 17, wherein the single bi-directional valve is a solenoid operated valve.

19. A flow divider assembly for use in conjunction with a prime mover driving a hydraulic pump, the flow divider assembly comprising:
- an inlet configured to be connected to the hydraulic pump;
- a first flow divider motor connected to the inlet and configured to provide hydraulic flow to a first outlet port through a first outlet passage;
- a second flow divider motor connected to the inlet and configured to provide hydraulic flow to a second outlet port through a second outlet passage; and
- a single valve connecting the first outlet passage to the second outlet passage.

20. The flow divider assembly of claim 19, further comprising a single motor shaft engaged to both the first flow divider motor and the second flow divider motor, whereby the first flow divider motor and the second flow divider motor have a common axis of rotation.

* * * * *